(12) United States Patent
Heise et al.

(10) Patent No.: US 7,739,909 B2
(45) Date of Patent: Jun. 22, 2010

(54) ACOUSTIC FLUID LEVEL MONITORING

(75) Inventors: Axel Heise, Mainz (DE); Christian Sachs, Frankfurt (DE)

(73) Assignee: GM Global Technology Operations, Inc., Detroit, MI (US)

( * ) Notice: Subject to any disclaimer, the term of this patent is extended or adjusted under 35 U.S.C. 154(b) by 436 days.

(21) Appl. No.: 11/557,669

(22) Filed: Nov. 8, 2006

(65) Prior Publication Data

US 2008/0104969 A1 May 8, 2008

(51) Int. Cl.
*G01F 23/28* (2006.01)
(52) U.S. Cl. .................. 73/290 V; 73/290 R; 73/579
(58) Field of Classification Search ............. 73/290 V, 73/579, 290 R
See application file for complete search history.

(56) References Cited

U.S. PATENT DOCUMENTS

| | | | | |
|---|---|---|---|---|
| 3,009,601 A | * | 11/1961 | Matsch | ................. 220/560.13 |
| 4,386,309 A | * | 5/1983 | Peschka | ...................... 322/2 R |
| 5,005,362 A | * | 4/1991 | Weltmer et al. | ............. 62/45.1 |
| 6,798,083 B2 | * | 9/2004 | Mueller | ...................... 307/9.1 |
| 6,810,925 B2 | * | 11/2004 | Graham et al. | ............... 141/98 |
| 6,824,305 B1 | * | 11/2004 | Boyd et al. | ................... 374/29 |
| 2004/0173021 A1 | * | 9/2004 | Lizon et al. | .............. 73/290 V |
| 2005/0183425 A1 | * | 8/2005 | Immel | ........................ 62/47.1 |
| 2006/0236744 A1 | * | 10/2006 | Wiest et al. | .................. 73/1.34 |

FOREIGN PATENT DOCUMENTS

| DE | 33 09 672 C1 | 5/1984 |
|---|---|---|
| DE | 10 2006006282 A1 | 8/2007 |

\* cited by examiner

*Primary Examiner*—J M Saint Surin

(57) ABSTRACT

A product including a cryogenic container and an acoustic sensor positioned to sense the resonant frequency of the container and any liquid contents therein.

29 Claims, 2 Drawing Sheets

ACOUSTIC FLUID LEVEL MONITORING

TECHNICAL FIELD

The present disclosure relates generally to fluid level monitoring and, more particularly, to an acoustic fluid level monitoring system for cryogenic containers.

BACKGROUND

Cryogenic containers have unique insulation requirements and are commonly used for very low temperature storage. Some vehicle fuel cells use cryogenic containers to store fuel in fluid form at very low temperatures. Measuring the fluid level inside of a cryogenic container can be difficult as both the containers and their contents pose special challenges.

SUMMARY

One embodiment includes a cryogenic container and an acoustic sensor positioned to sense the resonant frequency of the container and any liquid contents therein.

Another embodiment includes an inner container defining a storage area in which a fluid is stored, an outer container provided outside of the inner container, an insulation layer provided between the inner container and the outer container, and an acoustic sensor attached to the cryogenic container outside of the storage area.

Yet another embodiment includes a method of measuring the fluid level of a cryogenic container by measuring an acoustic resonant frequency of a cryogenic container, and correlating the acoustic resonant frequency of the cryogenic container to a fluid level inside the storage area.

DETAILED DESCRIPTION OF EXEMPLARY EMBODIMENTS

The following description of embodiments is merely exemplary in nature and is not intended to limit the invention, its application, or uses.

Cryogenic containers are commonly used for low temperature storage, fore example, generally below −150° C., −238° F., or 123 K. Many include inner and outer containers separated by insulation. This design limits heat transfer to the storage area inside the inner container. Cryogenic containers are typically designed to have exceptionally efficient insulation to maintain low temperatures without requiring complex refrigeration equipment. This is partially accomplished by limiting the number of potential heat paths to the storage area.

A potential heat path can be any wire, pipe, tube, or the like that creates a path between the storage area and the outer container. Any such path can potentially allow heat to travel to the storage area and reduce the cryogenic container's efficiency. A cryogenic container may be more efficient by limiting the number of potential heat paths, so it can maintain low temperature storage for longer periods of time without refrigeration.

Cryogenic containers are often used for storing liquefied gases, such as hydrogen, nitrogen, helium, and others. Certain liquefied gasses can be used in fuel cells and require cryogenic containers for storage. Some fuel cells are used in automotive applications that require in-vehicle cryogenic containers for fuel storage. In such applications it may be necessary and challenging to monitor the fuel or fluid level inside the cryogenic container.

Figure 1:
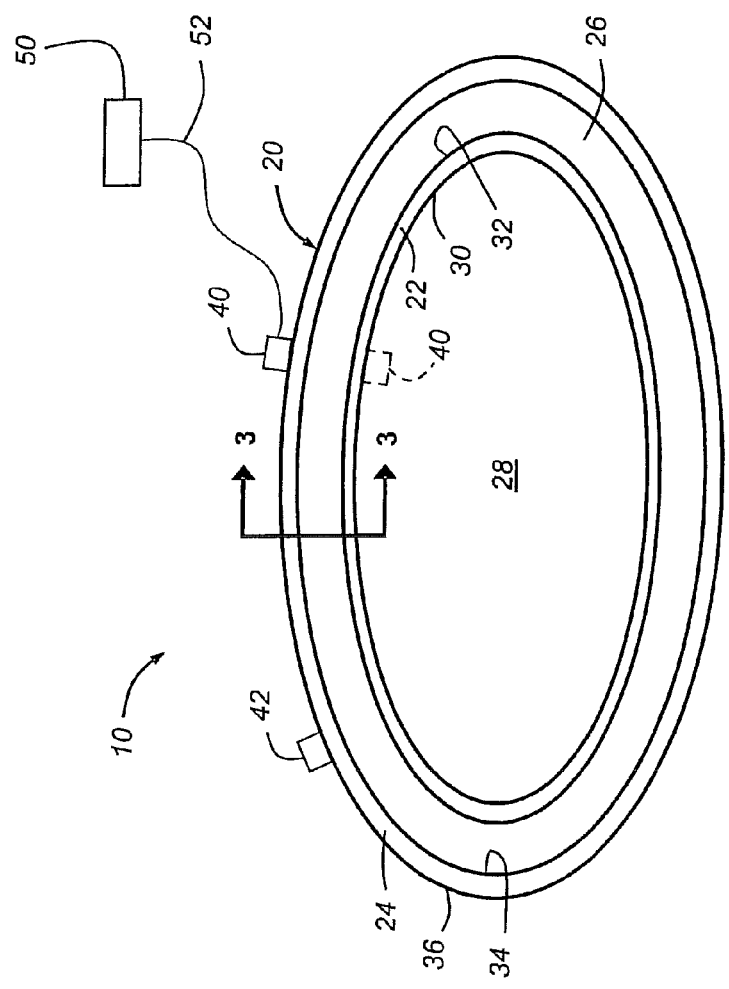
FIG. 1 illustrates a product according to one embodiment of the invention.

FIG. 1 illustrates one embodiment of an acoustic fluid level monitoring system 10. System 10 may generally include a cryogenic container 20, an acoustic sensor 40, and a signal processor 50. Cryogenic container 20 may include an inner container 22, an outer container 24, and an insulation layer 26 separating inner and outer containers 22, 24. Inner container 22 generally defines storage area 28 that houses the stored material. Cryogenic container 20, as shown, is generally known in the art so the following description simply provides a brief overview of one such cryogenic container. However, other containers not shown here could employ the disclosed system and method as well.

A substance, such as hydrogen, may be stored in storage area 28 in a fluid state. The substance is generally stored at very low temperatures and may also be pressurized. Generally, inner container 22 provides a barrier that prevents the stored substance from migrating from within storage area 28, whether the substance is a fluid, gas, or mixture. Insulation layer 26 generally provides efficient thermal insulation between inner and outer containers 22, 24. Insulation layer 26 may also provide structural support, as additional structural support may be required when storage area 28 is pressurized, for example. Outer container 24 generally provides additional structural support and protects insulation layer 26 and inner container 22 from external factors, such as the environment.

Generally, the substance stored in storage area 28 may be in both fluid and gaseous forms. The fluid is typically removed from storage area 28 through a suitable valve and pipe assembly (not shown). As the fluid is removed from storage area 28, the remaining volume is occupied with the substance in gaseous form. For example, liquid hydrogen may be stored in storage area 28. As the liquid hydrogen is removed from storage area 28, gaseous hydrogen generally fills the remaining volume.

Monitoring the fluid level within storage area 28 becomes increasingly important as cryogenic containers are used in mobile applications, such as for vehicle fuel cells. Since the stored substance is used as a fuel for powering the vehicle, the substance must be periodically replaced. Monitoring the fluid level aids in the replacement process.

As shown in FIG. 1, system 10 utilizes acoustic sensor 40 to monitor the fluid level within storage area 28 by sensing the acoustic resonant frequency of cryogenic container 20. To determine the fluid level, a first acoustic resonant frequency F1 of cryogenic container 20 is measured while storage area 28 is empty. A fluid substance is added to storage area 28, thereby changing the acoustic resonant frequency of cryogenic container 20. A second acoustic resonance frequency F2 can then be measured using acoustic sensor 40. The difference between F1 and F2 can then be calculated and correlated to the fluid level within storage area 28. As the fluid level changes within storage area 28, the acoustic resonant frequency will also change. Stated another way, fluid within storage area 28 changes the frequency of vibration for cryogenic container 20.

Acoustic sensor 40 measures the acoustic resonant frequency of cryogenic container 20 by sensing vibrations. Acoustic sensor 40 may be a piezo vibration sensor, a piezoelectric diaphragm, a laser vibrometer, an electromagnetic converter, or a semiconductor. Generally, signal processor 50 receives electrical or electromagnetic signals from acoustic sensor 40, and process those signals to determine the fluid level within storage area 28. Acoustic sensor 40 may use only one device for sensing the vibration of cryogenic container 20, or may use several devices located in different areas.

Figure 2:
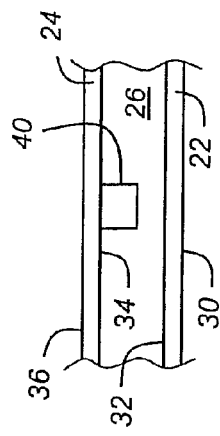
FIG. 2 illustrates a product according to another embodiment of the invention.
Figure 3:
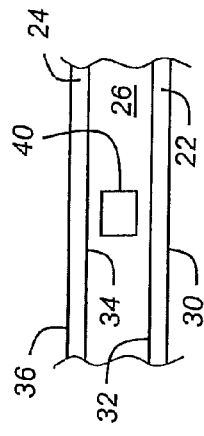
FIG. 3 illustrates a product according to another embodiment of the invention.
Figure 4:
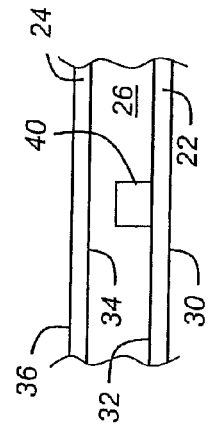
FIG. 4 illustrates a product according to another embodiment of the invention.

Turning now in more detail to FIGS. 1-4, acoustic sensor 40 may be placed in various locations. As shown, inner container 22 includes interior surface 30 and exterior surface 32, and outer container 24 includes interior surface 34 and exterior surface 36. In one embodiment shown in FIG. 1, acoustic sensor 40 is attached to exterior surface 36 of outer container 24. FIGS. 2-4 are sectional views taken along line 3-3 of FIG. 1. FIG. 2 illustrates another embodiment where acoustic sensor 40 may be located on interior surface 34 of outer container 24. FIG. 3 illustrates another embodiment where acoustic sensor 40 may be located within insulation layer 26. And FIG. 4 illustrates yet another embodiment where acoustic sensor 40 may be located on exterior surface 32 of inner container 22. Other embodiments are also envisioned, such as locating acoustic sensor 40 on interior surface 30 of inner container 22, thereby locating acoustic sensor 40 within storage area 28. Regardless of its location, acoustic sensor 40 communicates with signal processor 50.

Signal processor 50 may be any suitable device for receiving and processing signals from acoustic sensor 40. And signal processor 50 may be connected to acoustic sensor 40 by wire 52. They may also communicate by various wireless means using technologies such as radio frequency (RF), infrared (IR), or electromagnetism (EM), just to name a few. Signal processor 50 may be a digital computer with a digital signal processor (DSP) for receiving and analyzing signals from acoustic sensor 40. Signal processor 50 may also have electronic memory and software for calculating the fluid level within storage area 28. In one embodiment, signal processor 50 calculates a fluid level within storage area 28 after receiving a signal from acoustic sensor 40. The fluid level may be calculated by way of a lookup table, calculation, or other methods known to those skilled in the art. The fluid level can be calculated using an initial acoustic resonant frequency of cryogenic container F1 taken when storage area 28 is empty, and comparing F1 to the current acoustic resonant frequency F2. Signal processor 50 may also receive other data, such as temperature and pressure of storage area 28, and use such data to further refine the fluid level calculation based on the change in acoustic resonant frequency.

To measure the acoustic resonant frequency, an impulse may be generated to stimulate cryogenic container 20. An impulse generally may be anything that stimulates oscillation or vibration of cryogenic container 20. An impulse can be generated by impulse generator 42 or by natural phenomenon. For example, in an automotive fuel cell application when a fluid substance is stored within storage area 28, the impulse may result from fluid sloshing, a natural phenomenon. The stored fluid sloshes as the vehicle accelerates, decelerates, or turns. The sloshing fluid within storage area 28 causes vibrations, allowing acoustic sensor 40 to then measure the acoustic resonant frequency of cryogenic container 20.

In another embodiment, impulse generator 42 stimulates cryogenic container 20. Impulse generator 42 may be an actuator, a piezoelectric device, an electromagnetic converter, a semiconductor, or mechanical sound spring. In one embodiment, acoustic sensor 40 and impulse generator 42 are one device serving both functions. For example, a piezoelectric device can be driven by an external power source to produce vibrations, causing cryogenic container 20 to vibrate. The same piezoelectric device can then be used in a passive mode to measure the acoustic resonant frequency of cryogenic container 20. Alternatively, acoustic sensor 40 and impulse generator 42 may be separate devices located in various locations throughout cryogenic container 20.

Figure 5:
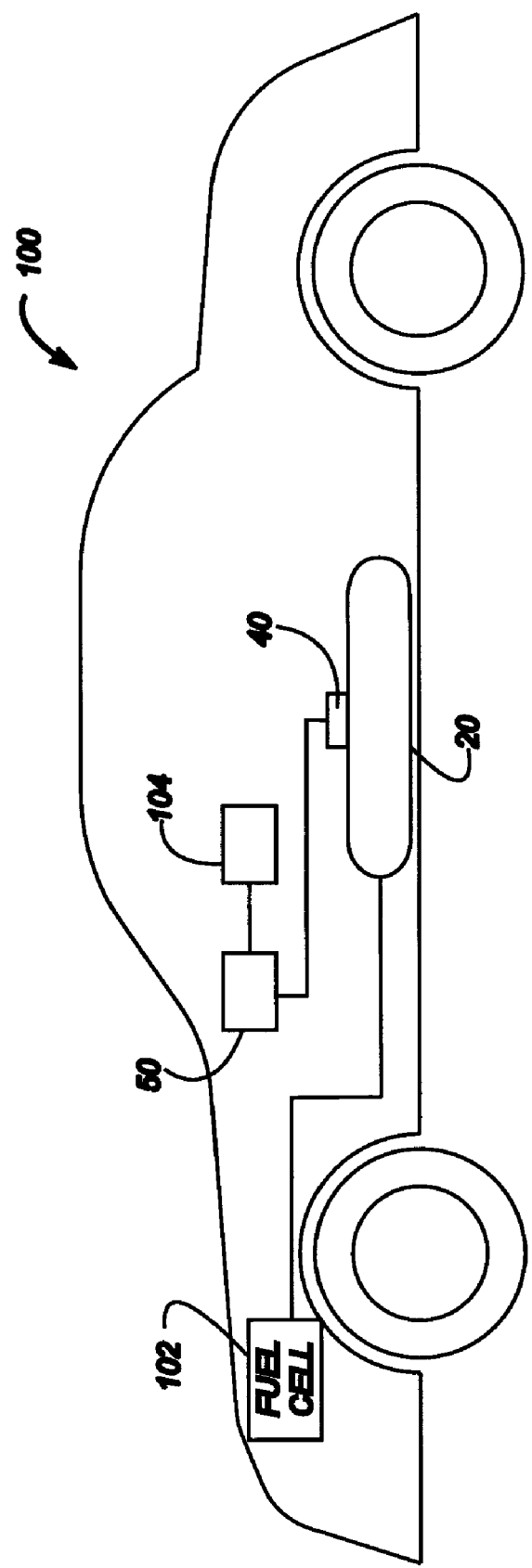
FIG. 5 illustrates a product according to another embodiment of the invention.

One embodiment may include a vehicle 100, such as an automobile, truck, bus, boat, military vehicle, etc. Vehicle 100, as shown in FIG. 5, may include a fuel cell 102 and a cryogenic container 20 for supplying liquid hydrogen to fuel cell 102. An acoustic sensor 40 may be provided to sense the resonant frequency of container 20. Acoustic sensor 40 is capable of communicating the sensed resonant frequency to signal processor 50. Signal processor 50 processes the signal received from acoustic sensor 40 and communicates with a tank level communication means 104, which then communicates the level of liquid hydrogen in container 20. Embodiments of tank level communication means 104 include, but are not limited to, a gauge, a digital display, a speaker, an audiovisual device, or another sensor that communicates with a vehicle computer or other vehicle hardware component. Tank level communication means 104 may communicate to a vehicle occupant, a vehicle system, or to a remote system via a wireless communication system.

The above description of certain embodiments of the invention is merely exemplary in nature and, thus, variations, modifications and/or substitutions thereof are not to be regarded as a departure from the spirit and scope of the invention. Tank assemblies embodying the present invention may have none, some, or all of the noted features and/or advantages. That certain features are shared among the presently preferred embodiments set forth herein should not be constructed to mean that all embodiments of the present invention must have such features.

We claim:

1. A product comprising:
    a cryogenic container and an acoustic sensor positioned to sense a resonant frequency of the container and any liquid contents therein wherein no impulse generator is used with the acoustic sensor.

2. The product as set forth in claim 1 further comprising a signal processor in communication with the acoustic sensor, wherein the signal processor calculates a fluid level in the container using the resonant frequency.

3. The product of claim 1 further comprising a signal processor in communication with the acoustic sensor.

4. The product as set forth in claim 1 wherein the acoustic sensor comprises a piezo vibration sensor, a piezoelectric diaphragm, a laser vibrometer, an electromagnetic converter, or a semiconductor, or any combination thereof.

5. The product as set forth in claim 1 further comprising an impulse generator.

6. The product as set forth in claim 1 wherein the cryogenic container further comprises an inner container for storing a fluid, an outer container provided outside of the inner container, and an insulation layer disposed between the inner container and the outer container.

7. The product as set forth in claim 6 wherein the acoustic sensor is positioned on an exterior surface of the outer container.

8. The product as set forth in claim 6 wherein the acoustic sensor is positioned on an interior surface of the outer container.

9. The product as set forth in claim 6 wherein the acoustic sensor is positioned on an exterior surface of the inner container.

10. The product as set forth in claim 6 wherein the acoustic sensor is positioned on an interior surface of the inner container.

11. The product as set forth in claim 6 wherein the acoustic sensor is positioned within the insulation layer.

12. The product as set forth in claim 1 further comprising a vehicle, a fuel cell, and a signal processor that communicates with a tank level communication means.

13. A cryogenic container assembly comprising:
   an inner container defining a storage area in which a fluid is stored;
   an outer container provided outside of the inner container;
   an insulation layer provided between the inner container and the outer container; and
   an acoustic sensor attached to the outer container or within the insulation layer wherein no impulse generator is used in the cryogenic container assembly.

14. The assembly of claim 13 wherein the acoustic sensor comprises a piezo vibration sensor, a piezoelectric diaphragm, a laser vibrometer, an electromagnetic converter, or a semiconductor, or any combination thereof.

15. The assembly of claim 13 wherein the acoustic sensor measures the resonant frequency of the cryogenic container.

16. The assembly of claim 13 wherein the acoustic sensor is mounted on an exterior surface of the outer container.

17. The assembly of claim 13 wherein the acoustic sensor is mounted on an interior surface of the outer container.

18. The assembly of claim 13 further comprising a signal processor in communication with the acoustic sensor.

19. The assembly of claim 18 wherein the signal processor receives a signal from the acoustic sensor and calculates a fluid level within the storage area.

20. The assembly of claim 13 further comprising an impulse generator.

21. The assembly of claim 20 wherein the impulse generator comprises an actuator, a piezoelectric device, an electromagnetic converter, a semiconductor, or mechanical sound spring, or any combination thereof.

22. The assembly of claim 20 wherein the impulse generator causes vibrations.

23. A method of measuring a fluid level of a cryogenic container comprising:
   measuring an acoustic resonant frequency of a cryogenic container; and
   correlating the acoustic resonant frequency of the cryogenic container to a fluid level inside the cryogenic container wherein the cryogenic container further comprises a storage area and the correlating step further comprises:
   measuring a first acoustic resonant frequency of the cryogenic container while the storage area is empty; and
   measuring a second acoustic resonant frequency of the cryogenic container while the storage area contains a liquid.

24. The method of claim 23 further comprising generating an impulse.

25. The method of claim 24 wherein the impulse is generated by the fluid inside the cryogenic container.

26. The method of claim 24 wherein the impulse is generated by a natural phenomenon.

27. The method of claim 26 wherein measuring the acoustic resonant frequency comprises using an acoustic sensor in a passive mode.

28. The method of claim 23 wherein the fluid inside the cryogenic container comprises liquefied hydrogen.

29. The method as set forth in claim 23 wherein the cryogenic container further comprises gaseous hydrogen.

* * * * *